Jan. 13, 1959     L. E. SMITH, JR     2,869,108
SONIC RADIO LINK WAVE HEIGHT METER
Filed Dec. 9, 1949     2 Sheets-Sheet 1
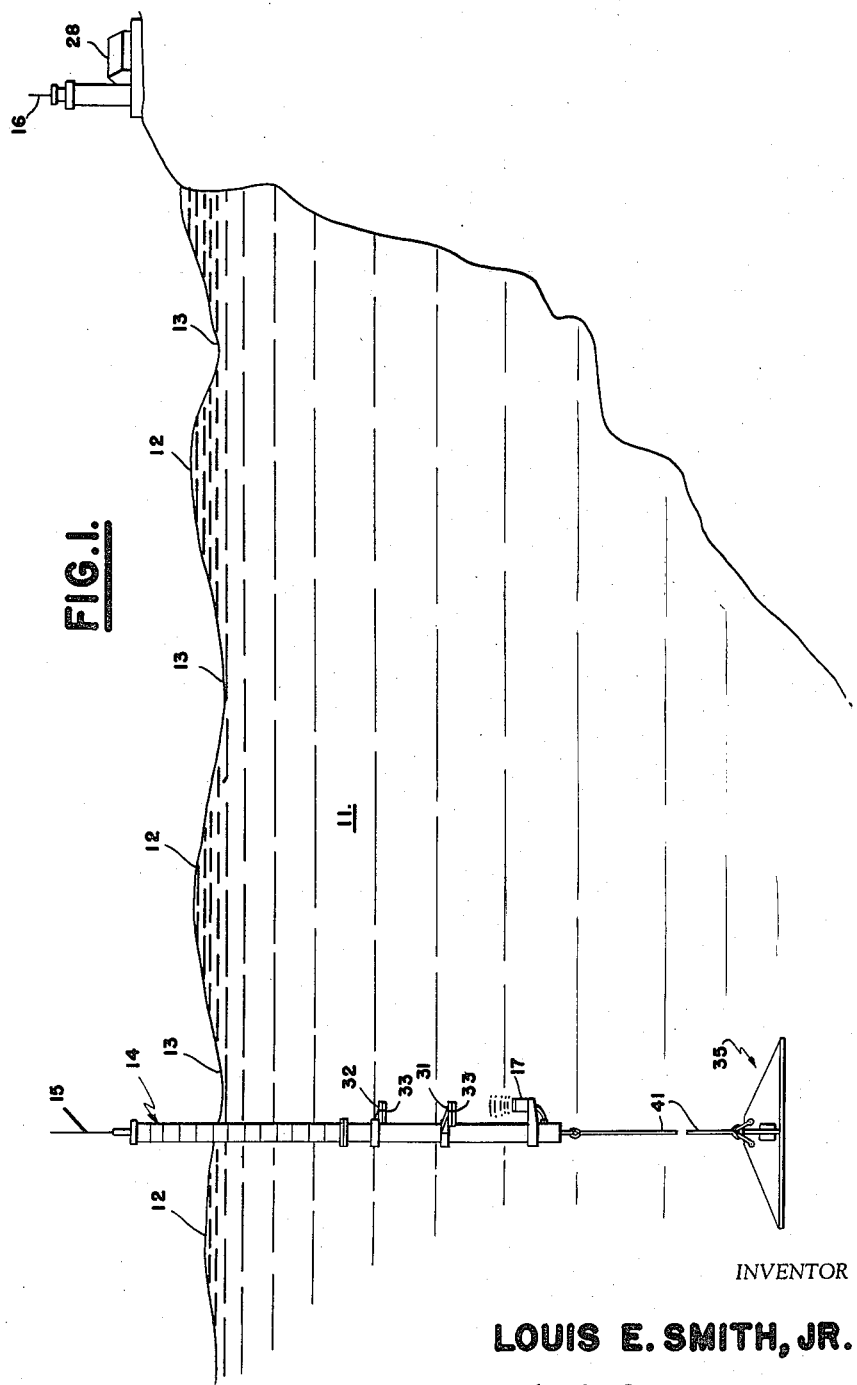
INVENTOR
LOUIS E. SMITH, JR.
BY
ATTORNEY

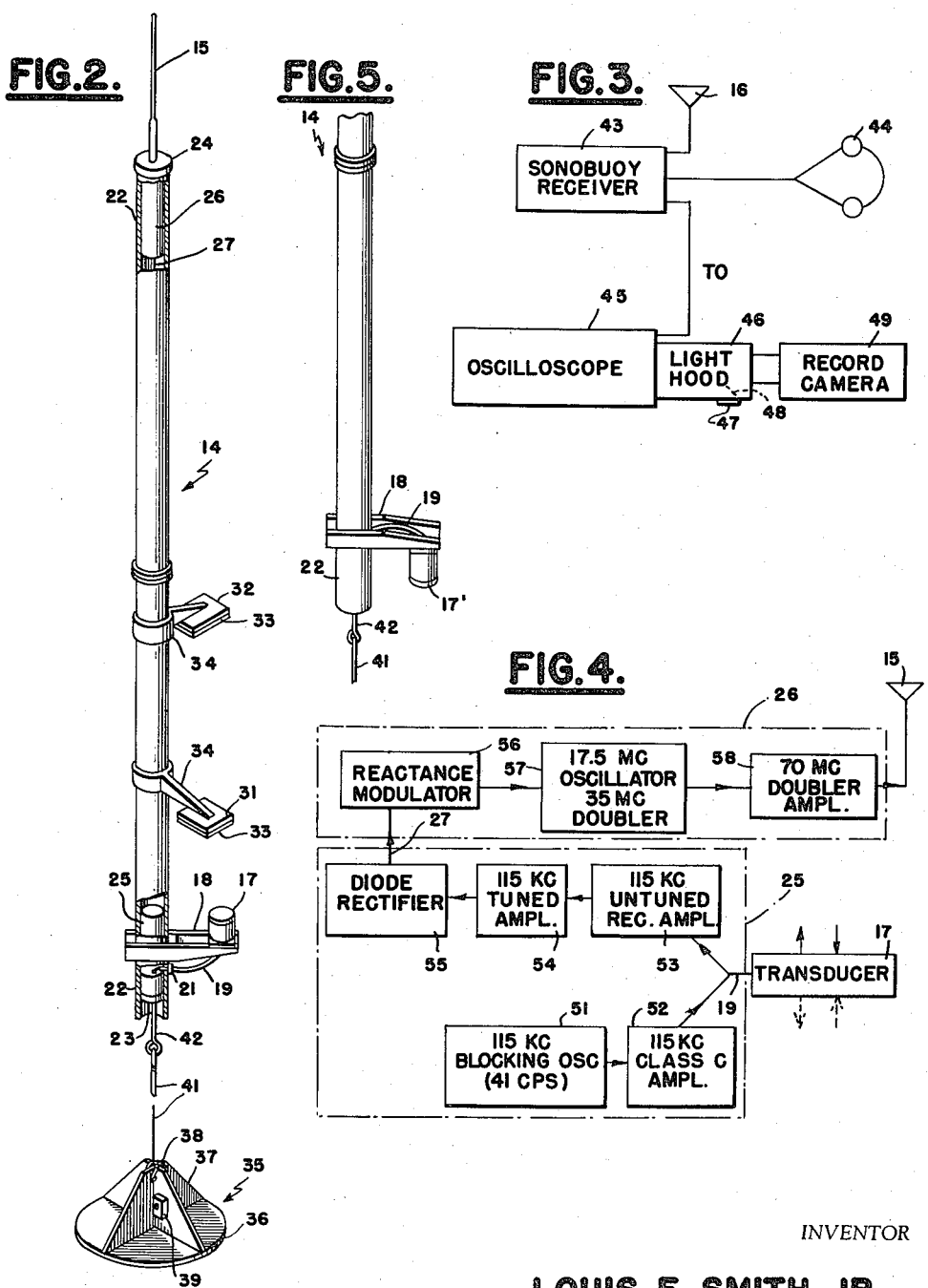

United States Patent Office 2,869,108
Patented Jan. 13, 1959

2,869,108

SONIC RADIO LINK WAVE HEIGHT METER

Louis E. Smith, Jr., La Mesa, Calif.

Application December 9, 1949, Serial No. 132,187

3 Claims. (Cl. 340—2)

(Granted under Title 35, U. S. Code (1952), sec. 266)

This invention relates generally to the art of recording tide, depth and sea wave data and more specifically to sonic measurement of wave height and frequency, sonic sounding and sonic measurement of tides, and to means for recording at a shore or aircraft station the sonic measurements made at a remote buoy station at sea.

Numerous naval and commercial operations require greatly increased accuracy and knowledge of wave and tide amplitudes, and related conditions in the operational areas. Military landing operations require precise knowledge of depth and of tide amplitude. Also submerged floating bodies carrying sonic equipment and/or measuring and signaling devices, floating mines, and the like, are ordinarily limited in effectiveness by wave motions which extend from the surface to considerable depths. Successful design of equipment for such purposes requires extensive systematic data relating to the kinds, frequencies and amplitudes of the waves and/or tides encountered, and similar data is required in correlating behavior of the designed equipment with respect to the wave conditions existing during periods of test. Other requirements for wave and tide data will be apparent to those skilled in the various pertinent arts, a further example being the charting of wave data about a storm center, for prediction of storm center movement.

It has heretofore been difficult to obtain sufficient data at exposed sea locations for the aforesaid purposes. Suitable means have not previously been available for accurately and reliably measuring tide or wave phenomena in deep water, or in locations remote from shore. This is especially true for storm periods when small surface craft are unsafe for occupancy and are subject to violent motion thereby preventing normal measurement or observation of wave data and obscuring tide conditions.

It has previously been proposed to obtain wave data by placing pressure responsive devices at the bottom of a bed of water and transmitting by electrical cable, signals from such devices as an indication of wave height and frequency. Such proposed systems are seriously limited in application, since other causes than waves contribute to sea pressure changes and since the pressure changes consequent upon wave motion are rapidly attenuated with increasing depth. Such systems have not proven satisfactory in practice and are of little value at moderate depths.

It is an object of this invention to provide means for measuring wave or tide amplitude irrespective of depth and independently of bottom pressure.

It is a further object to provide a method and means for automatic measurement of wave, tide and depth data at isolated locations and recording of such data at a remote station.

A further object is to provide an inexpensive self-contained expendable device for measuring and telemetering tide and wave data.

A still further object is to provide an improved tide or wave height measuring and calibrating means which is independent of water depth.

Yet another object is to provide stabilizing means for a sonobuoy whereby its position relative to the mean height of the water surface is held constant with respect to waves but variable with tide amplitudes.

Other objects and advantages of the invention will hereinafter become more fully apparent from the following description of the annexed drawings, which illustrate a preferred embodiment wherein like numerals designate like parts, and wherein:

Fig. 1 illustrates a wave recording system according to this invention, employing a radio link.

Fig. 2 is a side elevation of the sonobuoy of Fig. 1 somewhat enlarged, the baffle 35 being shown in reduced scale.

Fig. 3 is a block diagram of a receiver at the receiving station of Fig. 1.

Fig. 4 is a block diagram of a conventional sonobuoy modified according to this invention for use in the system of Fig. 1.

Fig. 5 illustrates a modification of the system for measurement of tides or taking mean soundings.

Referring now to Fig. 1 of the drawings, a body of water is illustrated at 11 having wave crests 12 and troughs 13 the difference of elevation of which may be regarded as the range of wave motion of the surface molecules, and one-half of the range being regarded as the amplitude of a simple harmonic motion most nearly approximating the actual wave motion at the surface. At increasing depths a similar motion of smaller amplitude will of course be present, the amplitude being directly related to depth.

A sonobuoy is generally indicated at 14 as of the expendable floating spar type and may be of any of the previously known designs embodying means for sending and receiving radio signals. As illustrated the sonobuoy is equipped with an antenna 15 for transmission of radio waves for reception at a shore or aircraft station, as by the antenna 16. It is contemplated that the radio receiving equipment may be ashore or aboard a survey or tracking vessel, or may be carried by an airplane as convenient.

Attached to the lower end of spar 14 of Fig. 2 is a transducer 17 mounted for vertical upward projection of high frequency sonic signals. The transducer 17 has a narrow beam characteristic both for projection and reception of high frequency waves, and is located a substantial distance from the spar by means of mounting bracket 18 extending horizontally from the spar and having means for mounting the transducer 17 in an upwardly directed position. By this structure only downwardly directed echoes are effectively received by the transducer during the listening portions of the cycle, and spurious noises entering from lateral directions, such as waves breaking on the shore, etc., are largely excluded by the receiving characteristic of the transducer.

An insulated cable 19, preferably coaxial, connects the transducer with the sonic transmitting and receiving equipment within the buoy 14, by way of a stuffing box at 21.

The block diagram of Fig. 4 illustrates a convenient circuit for energizing the transducer 17 during the sending of the sonic pulses into the water, the solid arrows indicating the direction of signal transit to and from the transducer. The broken arrows below the transducer are representative of the sonic output and echo return when the device is employed for sounding or tide measurement, the transducer being inverted as in Fig. 5 for this purpose.

The sonic signaling and receiving circuit is illustrated at 25 in Fig. 2 comprising an oscillator 51 and amplifier 52 feeding timed short duration pulses by way of cable 19 to the transducer 17. The interval of separation of the sonic pulses is adjustable according to the distance to be measured since it is undesirable to send a second pulse until after the return echo from the first has been received. The echo received at 17 is transmitted to the amplifier 53 by cable 19 and thence to amplifier 54 and rectifier 55. Any other well known sonic sending and receiving circuit may be employed in place of the arrangement of 25, as desired. The radio link transmitter is illustrated generally at 26 comprising frequency modulation means 56, a high frequency oscillator 57 employing a doubler circuit and the doubler output amplifier 58 feeding the antenna 15. The circuit of 26 is well known and is not a novel feature of the present invention, being included merely by way of illustration.

The spar buoy 14 comprises a cylindrical casing 22, shown partly broken away, and having sealed ends at 23 and 24. Within the enclosed space is located a battery power supply and the electronic sending and receiving circuit 25. The radio transmitter 26 is connected to the detector circuit of the apparatus 25 by a suitable electrical cable 27. The radio transmitter 26 may be arranged to send out frequency modulated or otherwise coded waves by way of the antenna 15, and a corresponding type of radio receiver is employed at the receiving station 28, hereinafter described.

The buoy 14 is provided with the aforesaid transmitting and receiving equipment in order to measure the depth of the transducer 17 for wave height measurement, and the elevation from bottom for averaged soundings as at 17'. Compressional wave pulses are transmitted vertically at 17 and strike the surface of the water thereabove and are reflected downward for reception at 17 during the interval between termination of a first pulse and commencement of a second pulse. The transit time from the transducer to the surface and back to the transducer is a measure of the distance, calculated from the velocity of sound in water in accordance with the usual sonar practice, thereby measuring variations in water surface height above the transducer 17.

In order to provide continuous calibration of the distance measurement referred to in the preceding paragraph a reflector 31 is placed at a fixed distance, for example 5 feet, from the transducer. A second reflector 32 is conveniently employed at a second fixed distance, for example 10 feet, from the transducer. Each of these reflectors comprises a metallic plate mounted in any suitable manner as by a bracket 34 to the buoy 14. The lower faces of the plates are preferably covered, respectively, with a layer of sound reflecting material 33 of suitable structure to return the echo therefrom. Air cell rubber of one quarter inch thickness is found suitable for this purpose. The reflectors 31 and 32 must be of sufficient size to return definite echoes, and hence be of much larger area than the brackets holding them, or than any other reflecting structure in the vicinity of the buoy. The air cell layer 33 gives a reflecting surface due to the difference in the velocity of sound in air and water. It is found that echoes from the two plates 31 and 32 mark are interval of time more accurately and simply than can be determined from the transit time from the projector 17 to the plate 31 and return. Thus in practice the second plate 32 is employed to provide the aforesaid difference of travel time rather than employing only the travel time to 31 and return. The echoes from 31 and 32 are both readily recorded alongside the echo from the surface, thereby giving two reference straight lines at varying distance from a third and varying line representing the variable depth of the transducer 17. A continuous calibration for the device is always provided for recording purposes by comparing the distance from one straight line to the varying line with the fixed distance between the two straight lines.

Since the apparatus described measures instantaneous depth of the transducer, means for holding the transducer at a fixed elevation relative to the bottom is required if wave height is to be measured. For this purpose a sea anchor or baffle 35 is provided to stabilize the buoy 14 in fixed elevational position. The baffle 35 is conveniently composed of a large horizontal plate 36 with a reinforcing vertical structure of fins 37, to which are attached a line 41 by the eyes 38. Suitable adjustment of righting moment and buoyancy for the buoy 14 is provided by addition of lead or other weights, as at 39, to the fins 37. The line 41 is secured by a suitable connecting link 42 to the lower end of the buoy 14 through the water seal 23. The baffle 35 may be of diameter ten to fifteen times larger than the buoy 14 to provide adequate stabilizing effect.

In operation the buoy may normally float with about one third of its height above calm water level, the buoy shown in Fig. 1 may float with half or more than half of its height above calm water level, in order that waves having troughs only a little above the transducer 17 will not have crests of height sufficient to submerge the active portion of the antenna 15 if a third section of tubing is added at the bottom of the buoy increasing its length by one half. The line 41 is of considerable length and may extend a large portion of the distance to the bottom especially at moderate or shallow depths, in order to place the baffle 35 in a region largely free from the motion of the surface waves. When so placed the baffle 35 effectively resists the changing pull on the line 41 due to oscillating motion of waves along the length of the buoy and the consequent change in buoyant force thereon. The plate 36 and fins 37 are of size and shape to prevent vertical motion of the buoy when the changing depth is of periodicity characteristic of water waves. For example, a four inch diameter buoy is effectively stabilized by a baffle of four feet diameter when placed at a considerable depth.

It will be seen from the description given that the buoy is stabilized with respect to wave period oscillations but that actual changes of mean water level such as accompany tidal movements are not averaged out because of the long period thereof and the buoyant characteristic of the buoy and stabilizer combination. In the case of tide changes there will be gradual adjustment of the buoy depth in response to the buoyancy of the combination. The wave height relative to the fixed reflector spacing is as easily observed in changing water depth as at a constant mean depth, since actual water depth or average depth of the transducer are not employed in finding wave height.

When a measurement of the tide amplitude is desired it may be seen that the modification of Fig. 5 is effective, providing at remote locations a measurement of depth which is stablized or averaged over the short periods characteristic of the surface waves, but unstabilized over the longer periods of tide action. In Fig. 5 the transducer 17' is merely inverted to direct the beam downwardly and to receive an upwardly reflected echo from bottom. Ordinarily the baffle 35 will also return an echo which is recordable alongside the line representing the averaged depth for wave periods and the unaveraged longer period depth variations. The length of line 41, fixed and known before the buoy is launched, provides a continuous calibration of the time of return of echo with respect to distance from the transducer. In this modification it is thus possible to measure the tide amplitudes at remote locations which are continually disturbed by waves, since an appropriately averaged mean depth is measured. Soundings thus made over a one day period are sufficient to gauge the tide without waiting for calm conditions of the sea or the taking of a large amount of data for statistical averaging. In this device the averaging is inherently accomplished in the stabilizer-buoy combination.

The receiver illustrated in block diagram in Fig. 3 comprises the antenna 16, a conventional frequency modulation detector receiver 43 and an output circuit including the audio channel for the phones 44, and an oscilloscope 45 driven, for example, in A-scan. A light hood 46 is provided for visual viewing of the screen by way of eye piece 47 and reflector 48. A recording camera 49 is provided for furnishing a continuous record of the measurements made at the sonobuoy. This camera is preferably of the continuously running type without shutter and having a film speed of about one foot per minute when used in wave measurements. The circuits in the receiver 43 are of conventional design such that well known receiving techniques may be selected and employed to produce the oscilloscope indications of echo return time and the calibration indications previously described.

In use the receiving station may be ashore as a fixed station or on a survey vessel or aircraft. The antenna 16 picks up the radio waves from the sonobuoy and after detection converts the signal to audible pulses. These audible signals in the system described will include a first pulse arising from the signal sent out from the amplifier 52 by way of the transducer, a part of the signal also entering the receiving amplifiers 53 and 54 and being broadcast as a modulated radio signal at 15 and detected at 43. The first and second calibration echoes from plates 31 and 32 are then broadcast as time pulses, occurring in quick succession after the sonar signal has gone out. A further echo from the surface, indicating transducer instantaneous depth, in the case of wave height measurements, then actuates the transmitter, and this will be heard as the fourth sound in the ear phones 44.

These sounds in the ear phones occur in rapid succession and serve only to tune the receiver to the proper channel. To provide permanent or transient visual indication of distances by the present system an oscilloscope is connected to the output of the receiver 43, in a manner to provide a spot displacement proportional to time, beginning at a zero time coincident with receipt of the radio pulse, and including a displaced spot position for each calibration pulse, and for the surface echo. Any of the well known scanning methods suitable for the purpose may be employed, it being merely necessary that spot displacement shall represent a distance proportional to the travel time of the sonar pulse and its echoes, the oscilloscope spot returning to an undeflected position before each pulse is projected.

A camera 49 is provided for recording the various pulses as time marks corresponding to the instantaneous values of the measurement being made. If this camera is of the shutterless continuous running type a photograph made over a considerable period of time records the instantaneous spot positions corresponding to the oscilloscope deflections for each of the calibration plate and surface or bottom echoes as linear arrangements of spots. The film, when passed at appropriate speed through the camera, fails to resolve the spots, therealong corresponding to the repeated oscilloscope signal deflections for the respective signal travel times for the several echoes. These unresolved spots on the film appear as continuous lines and a record is obtained showing continuous base lines with calibration marks parallel thereto, and a signal line of variable distance from the base line corresponding to the continually remeasured distance from transducer to surface, for wave height measurement, and to the distance from transducer to bottom for soundings or tide measurements.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A radio sonar system for measuring and displaying wave height at sea comprising a radio receiving station including means for receiving radio signals and means responsive thereto for rendering coded information therein visually representative of said information, a floating sonobuoy including transducer means secured thereto for sending and receiving vertically directed beamed sonic signals to and from the wave surface, means for repetitively energizing said transducer means to effect emission of pulse signals, reciving circuit means secured to said sonobuoy for detecting echoes of said pulse signals, means including a radio transmitter secured to said sonobuoy for transmitting radio signals, said transmitter including an antenna mounted atop said sonobuoy, and means for causing the radio signals to be modulated by said detected echoes, stabilizer means for preventing vertical oscillation of said sonobuoy at wave frequency and for permitting vertical oscillation of said sonobuoy at the much lower tide frequency, said stabilizer means including a line fixed to and extending from the lower end of said sonobuoy substantially below the influence of surface waves thereabout and a non-buoyant baffle member of horizontal area large with respect to the horizontal cross section of the sonobuoy, said baffle member being secured to the lower end of said line and having the negative buoyancy thereof adjusted to provide a predetermined maximum fractional submersion of the sonobuoy of less than unity.

2. The system of claim 1 including a pair of reflecting surfaces fixed to said sonobuoy and disposed in and normal to the path of said beamed sonic signals at known predetermined distances from each other and from said transducer means to provide a pair of echoes of fixed time separation automatically indicating at said receiving station a time versus distance calibration of said system.

3. Apparatus for measurng vertical distances relative to mean height of surface waves in a body of water comprising an elongated vertically disposed buoy, means for damping the vertical oscillations of the buoy caused by rise and fall of the waves thereabout, said means including a sea anchor suspended from said buoy above the bottom of said body of water and below the influence of surface waves, vertically directed sonar range finding means fixed to said buoy at a predetermined distance from said mean wave height for measuring time intervals indicative of the vertical distances to be measured, and radio means broadcasting from the apparatus a signal indicative of said time intervals.

References Cited in the file of this patent

UNITED STATES PATENTS

| Number | Name | Date |
|---|---|---|
| 283,091 | Farquhar | Aug. 4, 1883 |
| 2,156,519 | Walker | May 2, 1939 |
| 2,361,177 | Chilowsky | Oct. 24, 1944 |
| 2,418,846 | Meacham | Apr. 15, 1947 |
| 2,422,337 | Chilowsky | June 17, 1947 |
| 2,447,069 | Holcomb | Aug. 17, 1948 |
| 2,449,085 | Peterson | Sept. 14, 1948 |
| 2,465,696 | Paslay | Mar. 29, 1949 |
| 2,465,993 | Beechlyn | Apr. 5, 1949 |
| 2,567,229 | Morse | Sept. 11, 1951 |